(12) United States Patent
Lin et al.

(10) Patent No.: US 10,101,582 B2
(45) Date of Patent: Oct. 16, 2018

(54) HAND-HELD ELECTRONIC DEVICE AND PROTECTIVE CASE

(71) Applicant: HTC Corporation, Taoyuan (TW)

(72) Inventors: I-Hsuan Lin, Taoyuan (TW); Chih-Kai Hu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/162,635

(22) Filed: May 24, 2016

(65) Prior Publication Data

US 2017/0343800 A1    Nov. 30, 2017

(51) Int. Cl.
*G02B 27/01*    (2006.01)
*H04B 1/3888*    (2015.01)

(52) U.S. Cl.
CPC ....... *G02B 27/0101* (2013.01); *H04B 1/3888* (2013.01)

(58) Field of Classification Search
CPC ........ G02B 27/0101; G02B 2027/0118; G02B 2027/014; G02B 2027/0141; G02B 27/01; G02B 13/22; G02B 1/11; G02B 2027/0121; G02B 2027/0196; G02B 26/0833; G02F 1/133502; G02F 1/133308; G02F 1/13338; G02F 2001/133311; G02F 2001/133331; G02F 2201/38; G02F 2201/503; G02F 2202/28
See application file for complete search history.

(56) References Cited

U.S. PATENT DOCUMENTS

| | | | |
|---|---|---|---|
| 8,749,890 B1 | 6/2014 | Wood et al. | |
| 2009/0015901 A1* | 1/2009 | Yamada | G02F 1/133502 359/259 |
| 2013/0182330 A1* | 7/2013 | Cho | G02B 5/0289 359/599 |
| 2015/0286053 A1* | 10/2015 | Hu | G02B 27/0101 349/11 |
| 2016/0299340 A1* | 10/2016 | Wang | G02B 27/0101 |

FOREIGN PATENT DOCUMENTS

| | | |
|---|---|---|
| CN | 101625458 | 12/2011 |
| TW | 201028733 | 8/2010 |

OTHER PUBLICATIONS

"Office Action of Taiwan Counterpart Application," dated Mar. 21, 2017, p. 1-p. 4.

* cited by examiner

*Primary Examiner* — Golam Sorowar
(74) *Attorney, Agent, or Firm* — JCIPRNET

(57) ABSTRACT

A hand-held electronic device including a display device and an optical film is provided. The display device includes a display light source and displays information by a display light emitted by the display light source. The optical film is disposed on the display device. The display light emitted by the display light source for displaying the information is deflected by an angle after passing through the optical film to project the information on a display surface outside the display device. A protective case for protecting the hand-held electronic device is also provided.

8 Claims, 4 Drawing Sheets

HAND-HELD ELECTRONIC DEVICE AND PROTECTIVE CASE

BACKGROUND OF THE INVENTION

Field of the Invention

The disclosure relates to a hand-held electronic device, and more particularly, the disclosure relates to a hand-held electronic device having an optical film.

Description of Related Art

As technology advances, more and more new hand-held electronic devices, such as smart phones and tablet computers, are being introduced. Hand-held electronic devices, as media for transmitting information, are capable of receiving and displaying various texts or images. The hand-held electronic devices also allow users to acquire information related to time and weather, for example, and receive and read E-mails or text messages through a variety of communication applications.

However, when the hand-held electronic device is laid flat on a table or desk, for example, it is difficult for the user to see the messages displayed on the screen of the hand-held electronic device from certain viewing angles. For instance, when the user is at a lateral side of the hand-held electronic device or the user's sight line is below the display plane, the user may not be able to see the text or image displayed on the display device. In addition, for safety reasons, the user cannot hold the hand-held electronic device to watch the screen when driving and therefore may miss important messages.

SUMMARY OF THE INVENTION

The disclosure provides a hand-held electronic device that projects text or images displayed by a display device on a display surface through an optical film to provide a HUD (Head Up Display) function.

The disclosure provides a protective case that protects the hand-held electronic device and has an upper cover that serves as a projection screen for the hand-held electronic device to emit a display light and project text and images on the upper cover of the protective case through an optical film.

The disclosure provides a hand-held electronic device that includes a display device and an optical film. The display device includes a display light source and displays information by a display light emitted by the display light source. The optical film is disposed on the display device. The display light emitted by the display light source for displaying the information is deflected by an angle after passing through the optical film to project the information on a display surface outside the display device.

The disclosure provides a protective case for protecting a hand-held electronic device, which includes a display device that includes a display light source. The protective case includes a back housing, an upper cover, and an optical film. The hand-held electronic device is housed in the back housing. The upper cover is pivotally connected with the back housing and is pivotally rotatable to cover the display device. The optical film is disposed on the display device. The display device displays information by a display light emitted by the display light source, and the display light is deflected by an angle after passing through the optical film to project the information on the upper cover.

In an embodiment of the disclosure, the optical film is directly attached to a surface of the display device.

In an embodiment of the disclosure, the hand-held electronic device further includes a back housing that is disposed on a side opposite to the display device.

In an embodiment of the disclosure, the optical film is pivotally connected with the back housing through a pivot. The optical film is attached to the surface of the display device in a pivotally rotatable manner.

In an embodiment of the disclosure, the optical film includes a plurality of optical microstructures.

In an embodiment of the disclosure, the optical film is a light-reflecting film.

In an embodiment of the disclosure, the hand-held electronic device is a smart touch mobile phone or a tablet computer.

In an embodiment of the disclosure, the display surface includes a wall, a projection screen, or other projection planes.

In an embodiment of the disclosure, the upper cover is a translucent cover or a non-transparent cover.

Based on the above, the display device in the hand-held electronic device of the disclosure is provided with the optical film thereon, and the display device projects the display light for displaying the information on the display surface through the optical film, such that the hand-held electronic device provides a HUD (Head Up Display) function. Moreover, the protective case of the disclosure is capable of protecting the hand-held electronic device. In addition, the display light from the display device may be projected through the optical film to display the information on the upper cover of the protective case for the user to watch the information, such as text and images, displayed by the hand-held electronic device through the upper cover of the protective case.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
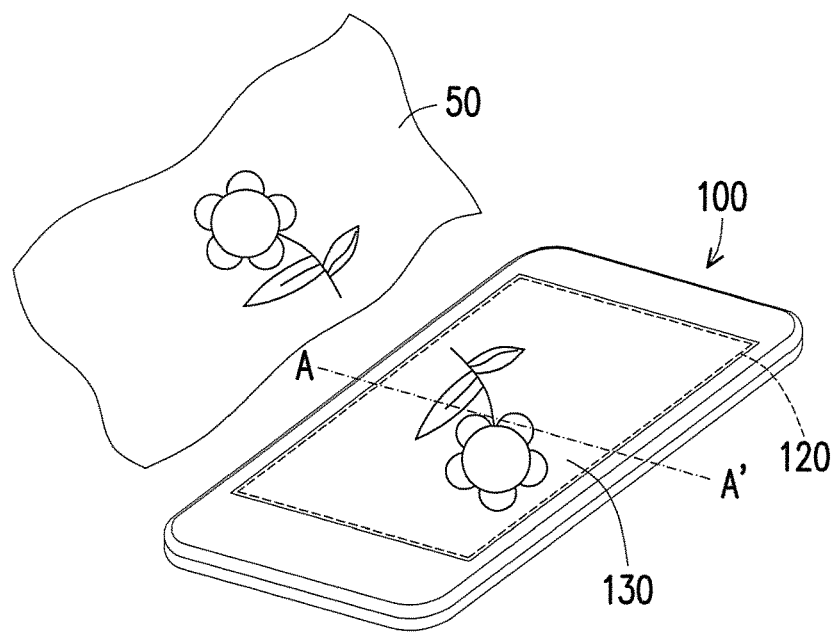
FIG. 1 is a schematic view of a hand-held electronic device according to an embodiment of the disclosure.

FIG. 1 is a schematic view of a hand-held electronic device according to an embodiment of the disclosure. FIG.

Figure 2:
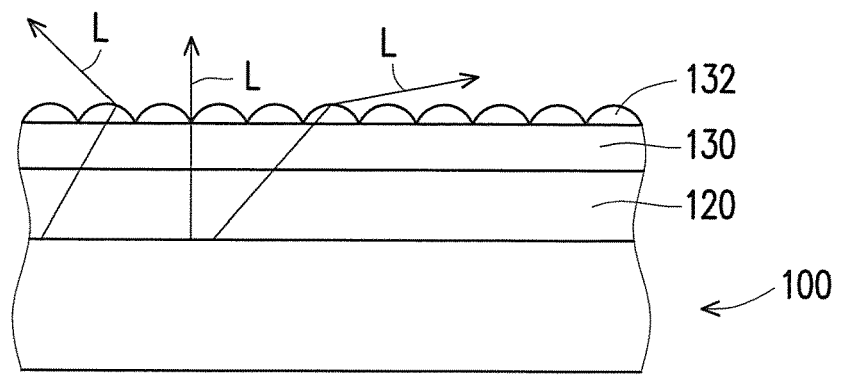
FIG. 2 is a schematic cross-sectional view of the hand-held electronic device of FIG. 1 taken along the line AN.

2 is a schematic cross-sectional view of the hand-held electronic device of FIG. 1 taken along the line AA'. Referring to FIG. 1 and FIG. 2, in this embodiment, a hand-held electronic device 100 includes a display device 120 and an optical film 130. Moreover, the display device 120 is a display panel, for example, and the display device 120 includes a display light source for emitting a display light L. For example, the display light source is a backlight source of the display device 120. The backlight source is a LED light source module, for example, for emitting the display light L. In addition, the display device 120 displays information, such as text and images, by the display light L. As shown in FIG. 2, the optical film 130 is disposed on the display device 120, and the display light L for displaying the information, such as text and images, emitted by the display light source is deflected by an angle with respect to an original traveling path after passing through the optical film 130 to project the information, such as text and images, on a display surface 50 outside the display device 120.

In this embodiment, the optical film 130 is directly attached to the display device 120. The optical film 130 is a light-reflecting film, for example. When the hand-held electronic device 100 is turned on, the display light L emitted by the display device 120 is incident to the display surface 50 through the optical film 130, so as to project the information, such as text and images, displayed by the display device 120 on the display surface 50. In this embodiment, the hand-held electronic device 100 is a smart mobile phone or a tablet computer, for example. Nevertheless, the form of the hand-held electronic device 100 of the disclosure is not limited thereto.

Furthermore, as shown in FIG. 2, the optical film 130 of this embodiment includes a plurality of optical microstructures 132, by which the display light L emitted by the display device 120 is reflected or deflected to the display surface 50, so as to project the information, such as text and images, displayed by the display device 120 on the display surface 50. In this embodiment, the display surface 50 is a wall, a projection screen, or other suitable projection planes.

For example, the display device 120 projects the text or images displayed thereon to the display surface 50, e.g., wall, through projection of the display light L, such that the hand-held electronic device 100 provides a HUD (Head Up Display) function. Therefore, when the user reads/watches text or images on the hand-held electronic device 100, the viewing angle is not restricted to a specific angle. Thus, the user does not look down to the hand-held electronic device 100 for a long period of time and neck pain or injury may be prevented. The hand-held electronic device 100 may also project time-related information displayed by the display device 120 on the display surface 50 through the optical film 130 by using the display light L. Therefore, when the user wants to know the time, the user is not required to hold the hand-held electronic device 100 and may intuitively read the time displayed by the display device 120 by watching the image projected on the display surface 50. With the aforementioned configuration, the hand-held electronic device 100 may be put on a table as a tool for telling the time, such as an electronic clock.

Figure 3:
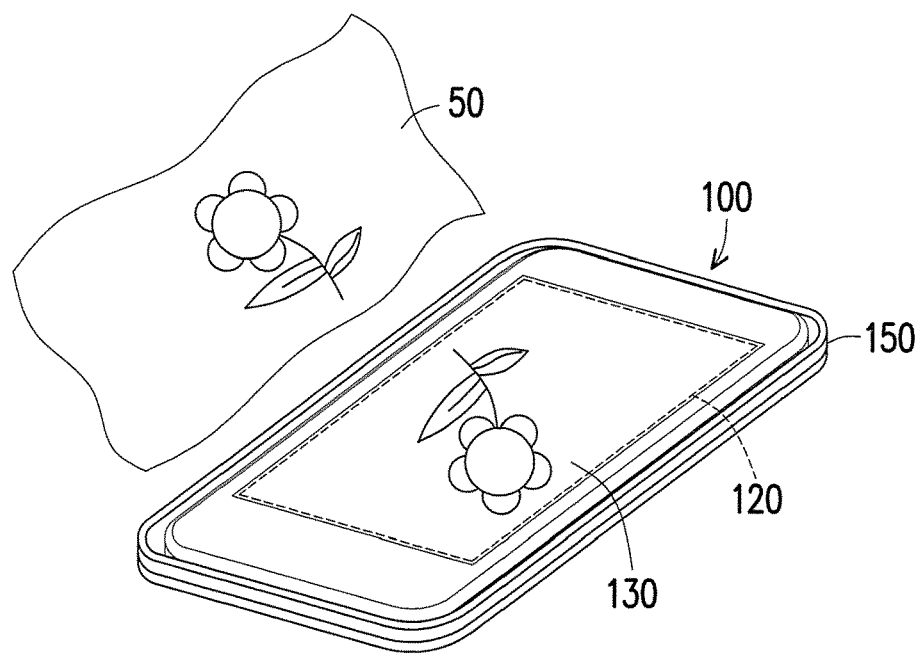
FIG. 3 is a schematic view of a hand-held electronic device according to another embodiment of the disclosure.

FIG. 3 is a schematic view of the hand-held electronic device according to another embodiment of the disclosure. In this embodiment, the hand-held electronic device 100 is provided with a back housing 150. The back housing 150 is disposed to cover a side opposite to where the display device 120 is disposed. As shown in FIG. 3, the back housing 150 covers a back side of the hand-held electronic device 100 to serve as a cushion and provide proper protection for the hand-held electronic device 100. In this embodiment, a material of the back housing 150 includes plastic or an elastic cushioning material.

Figure 4:
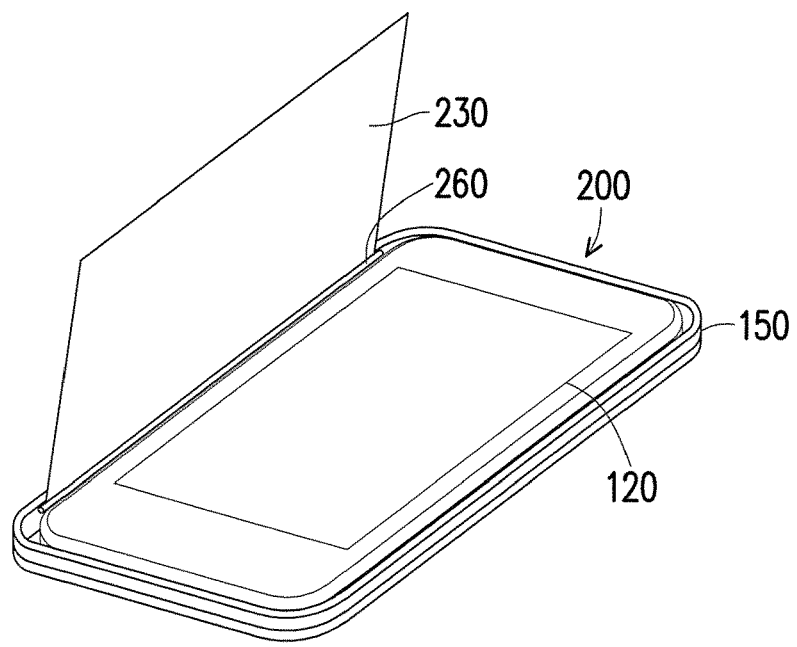
FIG. 4 is a schematic view of a hand-held electronic device according to another embodiment of the disclosure.

FIG. 4 is a schematic view of the hand-held electronic device according to another embodiment of the disclosure. The structures in the embodiments of FIG. 4 and FIG. 3 are similar to each other. Therefore, identical or similar components are denoted by the same or similar reference numerals and are not described again hereinafter. A difference between this embodiment and the embodiment of FIG. 3 is that a hand-held electronic device 200 of this embodiment includes an optical film 230 and a pivot 260. As shown in FIG. 4, the optical film 230 of the embodiment is pivotally connected with the back housing 150 of the hand-held electronic device 100 through the pivot 260. Thus, in this embodiment, the optical film 230 is attached to a surface of the display device 120 in a pivotally rotatable manner, so as to pivotally rotate with respect to the display device 120 around the pivot 260.

Specifically, when the user wants to stop projecting the information, such as text and images, displayed by the display device 120 of the hand-held electronic device 100 on the display surface 50, the optical film 230 may be pivotally rotated with respect to the display device 120 to be turned away from the surface of the display device 120. Therefore, the display light L emitted by the display device 120 is not projected on the display surface 50 through the optical film 230 any more. Thus, the information, such as text and images, displayed on the display device 120 is not displayed on the display surface 50. In this embodiment, the user of the hand-held electronic device 100 may pivotally rotate the optical film 230 to control the location of the optical film 230 with respect to the display device 120 and thereby control the direction and angle of the display light L projected on the display surface 50 by the display device 120 of the hand-held electronic device 200.

Figure 5:
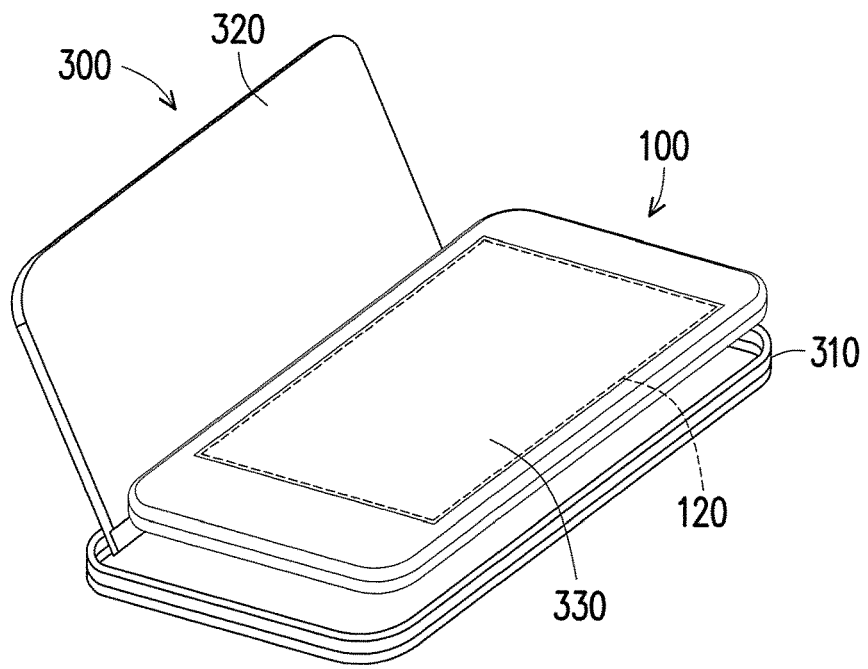
FIG. 5 is a schematic view of a protective case according to an embodiment of the disclosure.

FIG. 5 is a schematic view of a protective case according to an embodiment of the disclosure. In this embodiment, a protective case 300 protects the hand-held electronic device 100. The hand-held electronic device 100 includes the display device 120 that includes the display light source. In this embodiment, the protective case 300 includes a back housing 310, an upper cover 320, and an optical film 330. The back housing 310 houses the hand-held electronic device 100 therein. The upper cover 320 is pivotally connected with a side of the back housing 310 and is pivotally rotatable to cover the display device 120. Moreover, the optical film 330 is disposed on the display device 120. As shown in FIG. 2, the display light source of the display device 120 emits the display light L for displaying the information, such as text and images, which is deflected by an angle with respect to the original traveling path after passing through the optical film 330 so as to project the information, such as text and images, of the display device 120 on the upper cover 320 of the protective case 300.

Figure 6:
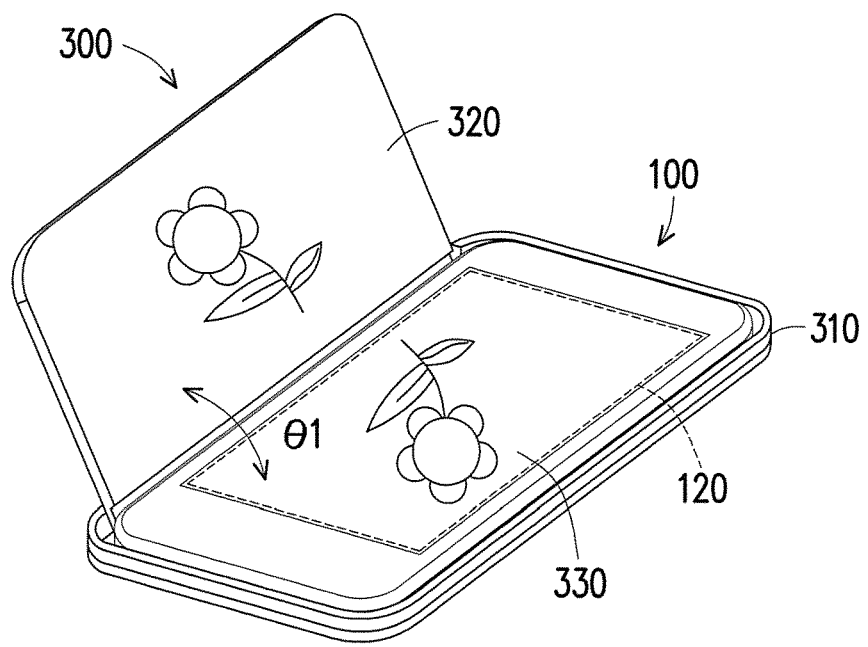
FIG. 6 depicts an embodiment of the protective case of FIG. 5.

FIG. 6 depicts an embodiment of the protective case of FIG. 5. Referring to FIG. 6, in this embodiment, a hinge structure (not shown) is disposed between the back housing 310 and the upper cover 320 for the upper cover 320 to pivotally rotate with respect to the back housing 310 and to be fixed at a specific pivoting angle with respect to the back housing 310. Thus, as shown in FIG. 6, an angle θ1 is formed between the upper cover 320 and the display device 120, and the angle θ1 changes as the upper cover 320 pivotally rotates with respect to the back housing 310. Accordingly, the display light L from the display device 120 for projecting information, such as time, message, and image, is reflected by the optical film 130 to be projected on the upper cover 320 held at the specific angle θ1.

In this embodiment, the upper cover 320 is a translucent cover or a non-transparent cover, for example, which serves as a projection screen for the display device 120 to project the display light L. Moreover, in this embodiment, a material of the upper cover 320 includes plastic or reinforced glass. It should be noted that, in a case where the upper cover 320 is a translucent cover, the user may watch the information projected from the display device 120 from both the projection face of the upper cover 320 and the other face opposite thereto. Moreover, the user may pivotally rotate the upper cover 320 with respect to the back housing 310 to adjust the relative positions of the upper cover 320 and the display device 120, so as to adjust a projection angle of the display light L of the display device 120 on the upper cover 320 and an imaging position of the light projection.

Figure 7:
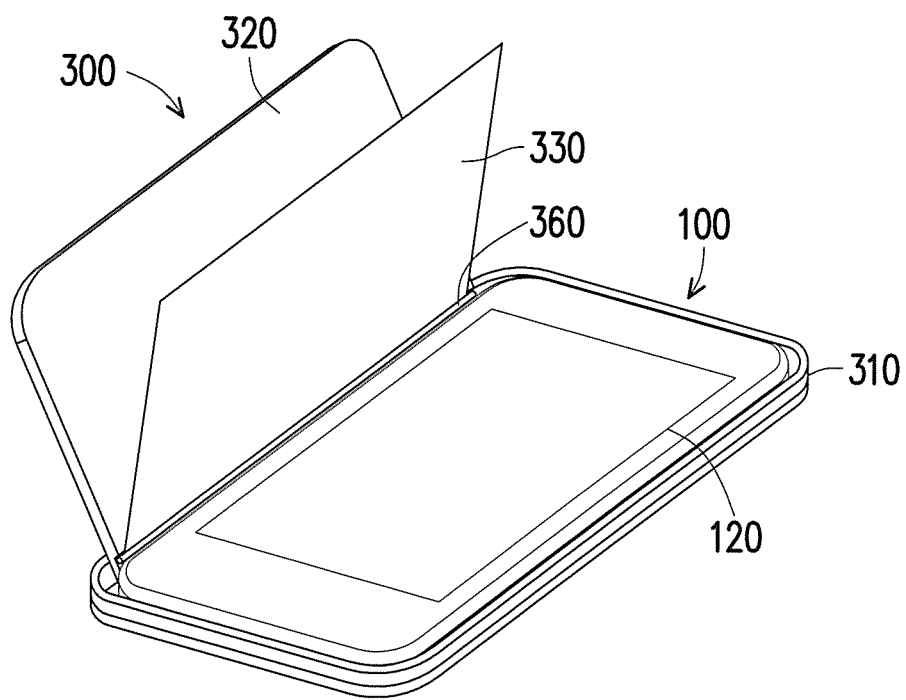
FIG. 7 is a schematic view of a protective case according to another embodiment of the disclosure.

FIG. 7 is a schematic view of the protective case according to another embodiment of the disclosure. The structures in the embodiments of FIG. 7 and FIG. 6 are similar to each other. Therefore, identical or similar components are denoted by the same or similar reference numerals and are not described again hereinafter. A difference between this embodiment and the embodiment of FIG. 6 is that the optical film 330 of this embodiment is pivotally connected with the back housing 310 of the protective case 300 through a pivot 360 for the optical film 330 to pivotally rotate with respect to the back housing 310 and the display device 120. Therefore, the optical film 330 is attached to the surface of the display device 120 in a pivotally rotatable manner. Thus, when the user wants to stop projecting the information displayed by the display device 120 on the upper cover 320, the optical film 330 may be pivotally rotated with respect to the display device 120 to be turned away from the surface of the display device 120. Hence, the display light L emitted by the display light source of the display device 120 is not projected on the upper cover 320 through the optical film 330 any more. Accordingly, the user may pivotally rotate the optical film 330 with respect to the back housing 310 to control the position of the optical film 330 with respect to the display device 120, so as to control the angle, direction, and position of the display light L of the display device 120 projected on the upper cover 320.

In this embodiment, because the upper cover 320 of the protective case 300 serves as the projection screen of the hand-held electronic device 100, the user is not required to search for other display planes as the projection face for the display light L of the display device 120. Moreover, because the upper cover 320 is pivotally rotatable with respect to the back housing 310, the upper cover 320 may be pivotally rotated to proper projection angle and position with respect to the display device 120 to achieve an ideal HUD function. Thus, in comparison with the previous embodiment where the image of the display device 120 is directly projected on the display surface 50, e.g., a wall, in this embodiment, the position and angle of the upper cover 320 are adjustable so as to obtain a clearer projection image.

To conclude, the display device in the hand-held electronic device of the disclosure is provided with the optical film thereon. The display device projects the display light for displaying the information, such as text and images, on the display surface through the optical film, such that the hand-held electronic device provides the HUD function. Moreover, the protective case of the disclosure is adapted for housing and protecting the hand-held electronic device, and the upper cover of the protective case is pivotally rotatable with respect to the back housing. The display light of the display device may also be projected on the upper cover of the protective case through the optical film to display the text or images on the upper cover. Therefore, the user may read/watch the text messages and images displayed by the display device through the display surface or the upper cover of the protective case, and the viewing angle for the user is increased. Accordingly, neck pain or injury that may occur when the user looks down to the hand-held electronic device for a long period of time may be prevented, and the user would not miss important instant messages when the user is driving or when the user is inconvenient to hold the hand-held electronic device.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hand-held electronic device, comprising:
a display device comprising a display light source and displaying information on a surface of the display device by a display light emitted by the display light source;
an optical film disposed on the display device, wherein the optical film is attached onto the surface of the display device and the display light emitted by the display light source for displaying the information is deflected with an angle by passing through the optical film to project the information on a display surface outside the display device;
a back housing covering a back side of the hand-held electronic device opposite to the display device; and
an upper cover pivotally connected with the back housing and pivotally rotatably covering the display device, wherein the optical film is pivotally connected with the back housing through a pivot and the optical film is attached to the surface of the display device in a pivotally rotatable manner.

2. The hand-held electronic device according to claim 1, wherein the optical film is directly attached to the surface of the display device.

3. The hand-held electronic device according to claim 1, wherein the optical film comprises a plurality of optical microstructures, and the display light emitted by the display light source is deflected by the angle by passing through the optical microstructure of the optical film.

4. The hand-held electronic device according to claim 1, wherein the optical film is a light-reflecting film.

5. The hand-held electronic device according to claim 1, wherein the hand-held electronic device is a smart touch mobile phone or a tablet computer.

6. The hand-held electronic device according to claim 1, wherein the display surface comprises a wall, a projection screen, or other projection planes.

7. A protective case for protecting a hand-held electronic device comprising a display device that comprises a display light source, the protective case comprising:
a back housing, in which the hand-held electronic device is housed, covering a back side of the hand-held electronic device opposite to the display device;
an upper cover pivotally connected with the back housing and pivotally rotatably covering the display device; and
an optical film disposed on the display device, wherein the display device displays information on a surface of the display device by a display light emitted by the display light source, the optical film is attached onto the surface of the display device and the display light emitted by the display light source for displaying the information is deflected with an angle by passing through the optical film to project the information on the upper cover;

wherein the optical film is pivotally connected with the back housing through a pivot and the optical film is attached to the surface of the display device in a pivotally rotatable manner.

8. The protective case according to claim 7, wherein the upper cover is a translucent cover or a non-transparent cover.

* * * * *